US 8,843,636 B1
Sep. 23, 2014

(12) United States Patent
Wu et al.

(54) MANAGING DIGITAL CERTIFICATES FOR WAN OPTIMIZATION OVER CONTENT DELIVERY NETWORKS (75) Inventors: David Tze-Si Wu, Fremont, CA (US); John S. Cho, Dublin, CA (US); Kand Ly, Richmond, CA (US)

(73) Assignee: Riverbed Technology, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/341,825

(22) Filed: Dec. 30, 2011

Related U.S. Application Data (60) Provisional application No. 61/494,390, filed on Jun. 7, 2011.

(51) Int. Cl.
*G06F 15/16* (2006.01)

(52) U.S. Cl.
USPC ............ 709/226; 709/232; 709/233; 713/156

(58) Field of Classification Search
USPC ......................................... 709/226, 232–233
See application file for complete search history.

(56) References Cited

U.S. PATENT DOCUMENTS

| | | | | |
|---|---|---|---|---|
| 6,751,729 | B1 * | 6/2004 | Giniger et al. ................ | 713/153 |
| 2004/0268118 | A1 * | 12/2004 | Bazan Bejarano ............ | 713/151 |
| 2005/0246519 | A1 * | 11/2005 | Ackerman et al. ............ | 713/100 |
| 2005/0265327 | A1 * | 12/2005 | Buch et al. .................... | 370/389 |
| 2007/0022469 | A1 * | 1/2007 | Cooper et al. .................... | 726/3 |
| 2007/0130457 | A1 * | 6/2007 | Kamat et al. ................... | 713/151 |
| 2008/0209216 | A1 * | 8/2008 | Kelly et al. .................... | 713/169 |
| 2009/0024763 | A1 * | 1/2009 | Stepin et al. ................... | 709/247 |
| 2009/0037388 | A1 * | 2/2009 | Cooper et al. .................... | 707/3 |
| 2009/0228967 | A1 * | 9/2009 | Gbadegesin et al. ............. | 726/8 |
| 2010/0122175 | A1 * | 5/2010 | Gupta et al. ................... | 715/735 |
| 2010/0299525 | A1 * | 11/2010 | Shah et al. .................... | 713/171 |
| 2010/0318665 | A1 * | 12/2010 | Demmer et al. ............... | 709/227 |
| 2011/0153721 | A1 * | 6/2011 | Agarwal et al. ............... | 709/203 |
| 2012/0266231 | A1 * | 10/2012 | Spiers et al. ................... | 726/12 |

FOREIGN PATENT DOCUMENTS

| | | | | |
|---|---|---|---|---|
| EP | 1921557 A1 | * | 5/2008 | ............. G06F 21/00 |
| WO | WO 2009066978 A2 | * | 5/2009 | ............. H04L 29/06 |

OTHER PUBLICATIONS

Rajkumar Buyya, InterCloud: Utility-Oriented Federation of Cloud Computing Environments for Scaling of Application Services, 2010, Springer-Verlag Berlin Heidelberg, p. 13-31.*

* cited by examiner

*Primary Examiner* — Farid Homayounmehr
*Assistant Examiner* — Lizbeth Torres-Diaz
(74) *Attorney, Agent, or Firm* — Park, Vaughan, Fleming & Dowler LLP (57) ABSTRACT

Digital certificates are distributed to WAN optimization modules in organization and content delivery networks to securely optimize network traffic. The content delivery network identifies edge WAN optimization modules for use with each combination of organizations and their cloud services and distributes digital certificates accordingly. Peering digital certificates for establishing inner connections between organization and edge WAN optimization modules are exchanged via one or more management portals. Shadow digital certificates for establishing outer connections between WAN optimization modules and clients are generated in the form of certificate signing requests. Configuration information identifies any additional cloud services associated with a given cloud service and generate corresponding additional certificate signing requests. Certificate signing requests are digitally signed by a certificate signing authority associated with the organization and then returned via the one or more management portals to the allocated edge WAN optimization modules. Digital certificates may be rotated for security purposes.

19 Claims, 7 Drawing Sheets

MANAGING DIGITAL CERTIFICATES FOR WAN OPTIMIZATION OVER CONTENT DELIVERY NETWORKS

CROSS-REFERENCE TO RELATED APPLICATIONS

This application is related to U.S. patent application Ser. No. 13/249,195, filed Sep. 29, 2011, and entitled "Configuring and Authenticating WAN Optimization Devices for Accessing Content Delivery Networks"; and to U.S. patent application Ser. No. 13/249,201, filed Sep. 29, 2011, and entitled "Integrating WAN Optimization Devices with Content Delivery Networks," both of which are incorporated by reference herein. This application claims priority to U.S. Provisional Patent Application No. 61/494,390, filed Jun. 7, 2011, and entitled "Integrating WAN Optimization Devices with Content Delivery Networks," which is incorporated by reference herein.

BACKGROUND

The invention relates to the field of computer networks and systems and methods for optimizing and accelerating network traffic. Many organizations are using so-called "cloud" computing systems and services to provide on-demand provisioning of computing resources, such as processing resources, storage resources, content hosting; and/or application software. In cloud computing, computing resources are accessed via a wide-area network, such as the internet, using client systems. Cloud computing systems and services may implement and provide access to any type of computing resource, software application, and/or service. Examples of cloud computing systems include the software-as-a-service (SaaS) and infrastructure-as-a-service (IaaS). These systems are referred to herein generally as cloud systems.

Because the majority of the processing and storage is provided by the cloud system, client systems accessing the cloud system typically do not require substantial computing resources and may only require a minimal operating system and/or web browser to access the resources provided via cloud computing. Additionally, the cloud system handles the majority of system configuration, system maintenance, and system and data backup and other reliability measures. Furthermore, cloud systems may consolidate computing resources for many different customers, thereby enhancing economies of scale. For these reasons, cloud systems are often less expensive and more reliable than locally-implemented computing systems.

However, the bandwidth and latency limitations of the wide-area network (WAN) that connects clients with cloud systems has a substantial impact on actual and perceived system performance. One approach to improving WAN performance, especially over the internet, is the use of a content delivery network. A content delivery network is a system of computers located at or near common network destinations, referred to as "edge" locations. For dynamic network traffic, these edge computers may perform enhanced network routing and TCP protocol optimization to reduce the impact of WAN latency on system performance.

WAN optimization devices are a second approach to improving WAN performance. A WAN optimization device typically monitors clients' network traffic to attempt to predict data likely to be requested by clients in the near future. This predicted data is prefetched over the WAN and stored by the WAN optimization devices at the clients' respective network locations, so that this data can be quickly accessed by users if requested. WAN optimization devices also typically compress data for communication over the WAN.

WAN optimization devices may be used with both private and public WANs, including, in the latter case, the internet. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. Herein, the term "WAN optimization device" is used to refer to such devices and applications and "WAN optimization" is used to refer to such techniques.

WAN optimization functionality may be integrated with content delivery networks to optimize network traffic on both private LANs and WANs within an organization and public WANs such as the internet. The integration of these two different optimization techniques is described in detail in the above-referenced related applications. An integrated WAN optimization and content delivery network system enables WAN optimization techniques (and their associated increased performance benefits) over public WANs such as the internet without requiring cloud systems or other network destinations to integrate and configure WAN optimization devices.

Many cloud systems use secure communications protocols for communicating with their clients. Examples of secure communications protocols include the Transport Layer Security (TLS) standards and predecessor Secure Sockets Layer (SSL) standards and the Internet Protocol Security (IPSec) standard. To initiate secure communications, the two parties need to verify each others' identities and exchange encryption keys. This is often done using public key or digital certificates that associate a public key with an identity using a digital signature. Exchanging digital certificates in systems using WAN optimization over content delivery networks is complicated because network traffic between the client and the cloud system intercepted by a client's WAN optimization system on one end and the content delivery network on the other end.

SUMMARY

Embodiments of the invention distribute digital certificates to WAN optimization modules in organization networks and content delivery networks to enable the establishment of multiple secure network connections for optimizing network traffic. The secure network connections include inner network connections between organization and edge WAN optimization modules and outer network connections between clients and organization WAN optimization modules and between edge WAN optimization modules and cloud services. In a further embodiment, the content delivery network identifies one or more edge WAN optimization modules for use with each combination of an organization and its cloud services and distributes digital certificates accordingly.

In an embodiment, peering digital certificates for establishing inner connections are exchanged via one or more management portals, such as a WAN optimization configuration portal and/or a content delivery network portal. The peering digital certificates may be rotated for security purposes. In an embodiment, a management portal supervises the distribution of digital certificates and enables their usage only when this distribution is complete.

In an embodiment, shadow digital certificates for establishing outer connections between WAN optimization modules and clients are exchanged via one or more management portals, such as a WAN optimization configuration portal and/or a content delivery network portal. In a further embodiment, shadow digital certificates are generated in the form of certificate signing requests for edge WAN optimization modules allocated to an organization and its cloud services. In still a further embodiment, configuration information may be used to identify additional cloud services associated with a given cloud service and generate corresponding additional certificate signing requests. One or more certificate signing requests may be exchanged via one or more management portals for digital signing by a certificate signing authority associated with the organization. Signed digital certificates are then returned via the one or more management portals to the allocated edge WAN optimization modules. In an additional embodiment, the shadow digital certificates may be rotated for security purposes.

BRIEF DESCRIPTION OF THE DRAWINGS

The invention will be described with reference to the drawings, in which.

DETAILED DESCRIPTION

Embodiments of the invention include systems and methods for integrating WAN optimization devices with content delivery networks. Embodiments of the invention may use WAN optimization devices and content delivery networks together to optimize network traffic on both private LANs and WANs within an organization and public WANs such as the internet. Additionally, embodiments of the invention enable WAN optimization techniques (and their associated increased performance benefits) over public WANs such as the internet without requiring cloud computing systems or other network destinations to integrate and configure WAN optimization devices.

In an embodiment, a WAN optimization device intercepts network traffic from one or more clients within an organization's networks. The WAN optimization device may compress and optimize some or all of this network traffic using techniques including data deduplication, data prefetching, and network protocol and application streamlining. The WAN optimization device then communicates this first optimized network traffic to the nearest edge computer in the content delivery network via a public WAN, such as the internet. This edge computer then further optimizes the network traffic and communicates the doubly optimized network traffic via the content delivery network to a second edge computer nearest to the network traffic destination. The second edge computer receives this doubly optimized network traffic and converts it back to its original format. This reconstructed network traffic is then communicated from the second edge computer to the destination cloud computing system or service via a public WAN.

Figure 1:
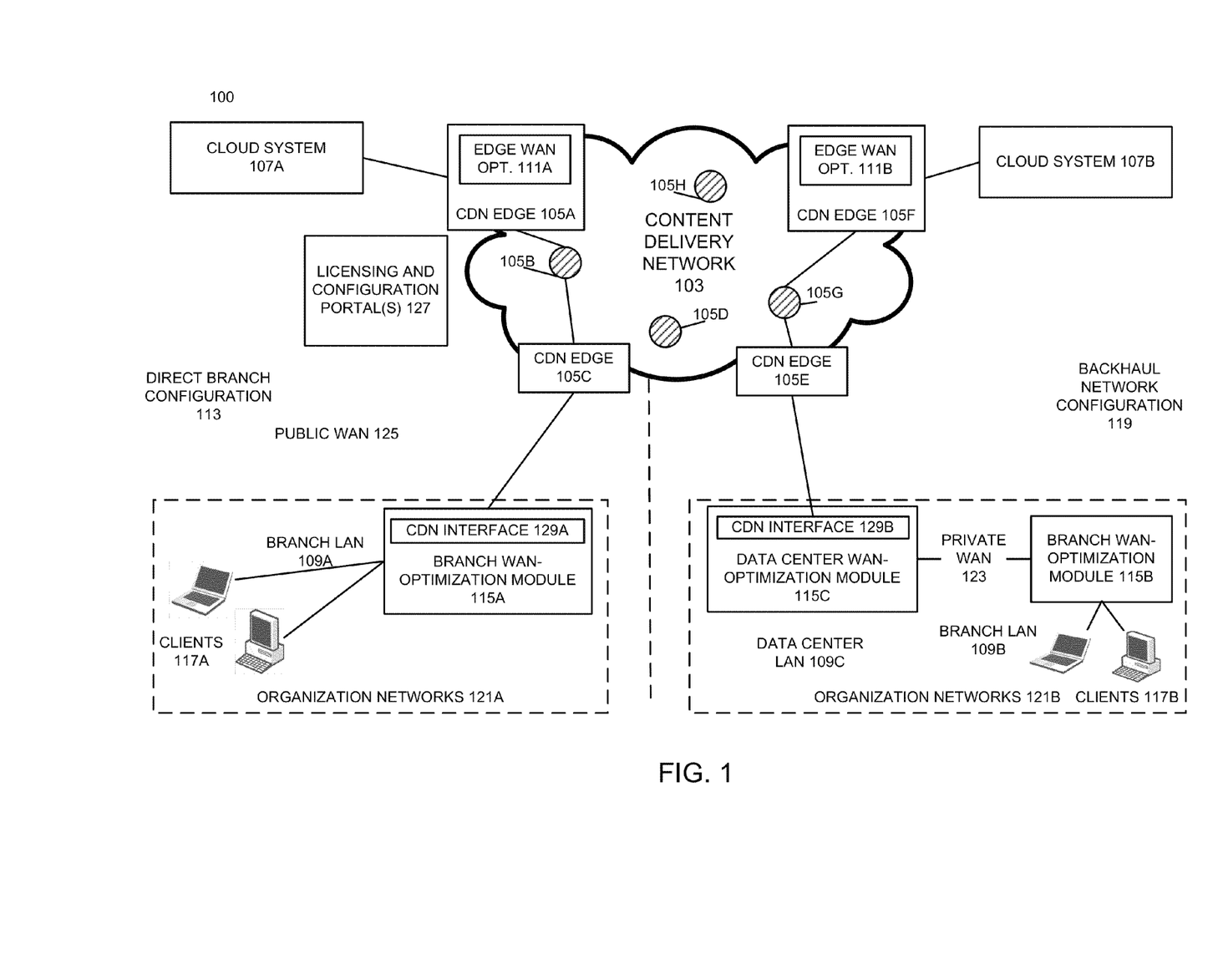
FIG. 1 illustrates example systems integrating WAN optimization devices with content delivery networks according to embodiments of the invention.

FIG. 1 illustrates two example systems integrating WAN optimization devices with content delivery networks according to embodiments of the invention. In both example systems, a content delivery network (CDN) 103 includes one or more edge computer systems 105 located close to (in terms of network topology) the sources and destinations of network traffic, such as cloud systems 107 and client enterprises or other organizations 121. By locating edge computer systems 105 near sources and destinations of network traffic, the content delivery network 103 reduces network latency. The edge computer systems 105 are adapted to communicate with each other efficiently over a public WAN such as the internet or in parallel with the public WAN using a private backhaul network. Each of the edge computer systems 105 may use optimized routing and streamlined network protocols to efficiently transport network traffic to any other of the edge computer systems 105.

To integrate with WAN optimization devices and further improve network performance, at least some of the edge computers in the content delivery network 103, such as edge computers 105A and 105F, include WAN optimization capabilities. WAN optimization capabilities in edge computers may be implemented using WAN optimization hardware, software, and/or virtual machine modules 111. For example, edge computers 105A and 105F include edge WAN optimization modules 111A and 111B. These WAN optimization capabilities in the edge computing systems operate in conjunction with WAN optimization modules within private networks in enterprises or other organizations. The WAN optimization capabilities in the edge computers 105 in the content delivery network are referred to herein generally as edge WAN optimization modules, regardless of whether they are implemented as hardware, software, and/or using virtualization.

In one embodiment, referred to as a direct branch configuration 113, a branch WAN optimization module 115A located within a private LAN 109A of an organization's network 121A intercepts network traffic from clients 117A that is associated with a cloud computing system or service. WAN optimization capabilities in private networks may be implemented using WAN optimization hardware, software, and/or virtual machine modules. The WAN optimization capabilities in private branch or data center networks are referred to herein generally as organization WAN optimization modules, regardless of whether they are implemented as hardware, software, and/or using virtualization.

The branch WAN optimization module 115A compresses and optimizes this network traffic using techniques including data deduplication, data prefetching, and network protocol and application streamlining. The branch WAN optimization module 115A then communicates this first optimized network traffic to the nearest edge computer 105C in the content delivery network 103 via a public WAN 125, such as the internet. This edge computer 105C then further optimizes the network traffic and communicates the doubly optimized network traffic via the content delivery network 103 to a second edge computer 105A nearest to the network traffic destination. The second edge computer 105A receives this doubly optimized network traffic and, using edge WAN optimization module 111A, converts it back to its original format. This reconstructed network traffic is then communicated from the edge WAN optimization module 111A to the destination cloud computing system or service 107A. The reconstructed network traffic may also include additional network traffic introduced as part of the WAN optimization process, such as speculatively issued network requests for data, services, network protocol operations, and/or application-level operations.

In another embodiment, referred to as a backhaul network configuration 119, a branch WAN optimization module 115B located within a private LAN 109B of an organization's networks 121B intercepts network traffic associated with a cloud computing system or service from client systems 117B. The branch WAN optimization module 115B compresses and optimizes this network traffic using techniques including data deduplication, data prefetching, and network protocol and application streamlining. The branch WAN optimization module 115B then communicates this first optimized network traffic from a branch LAN 109B via a private WAN 123 to a data center LAN 109C and a data center device 115C, which may be another WAN optimization module or a standalone content delivery network interface. The data center device 115C is connected with the data center LAN (DCLAN) 109C and a public WAN 125 such as the internet. The data center device 115C communicates the optimized network traffic to the nearest edge computer 105E in the content delivery network 103. This edge computer 105E then further optimizes the network traffic and communicates the doubly optimized network traffic via the content delivery network 103 to a second edge computer 105F nearest to the network traffic destination. The second edge computer 105F receives this doubly optimized network traffic and, using edge WAN optimization module 111B, converts it back to its original format. This reconstructed network traffic is then communicated from the edge WAN optimization module 111*b* to the destination cloud computing system or service 107B. As with the other embodiment discussed above, the reconstructed network traffic may also include additional network traffic introduced as part of the WAN optimization process.

In a further application of this second embodiment 119, the network traffic from a branch LAN 109B may be inspected, analyzed, redirected, and/or modified at the data center LAN 109C by a firewall, proxy, load balancer, router, or other type of network inspection device. In this application, the data center WAN optimization module 115C and the branch WAN optimization module 115B are used to optimally transport network traffic from the branch LAN 109B to the data center LAN 109C through the private WAN 123. At the data center LAN 109C, the data center WAN optimization module 115C reconstructs the original network traffic for the purpose of inspection, analysis, and/or modification. The data center WAN optimization module 115C may provide the reconstructed network traffic to the network inspection device, which may be implemented as a separate network device or as a software process or virtual machine within the data center WAN optimization module 115C or any other device. Any network traffic that passes through this inspection network device is then forwarded back to the data center WAN optimization module 115C or any other WAN optimization module to reoptimize this network traffic.

The data center WAN optimization module 115C may perform similar types of optimizations as the branch WAN optimization module 115B. Once the network traffic has been reoptimized by the data center WAN optimization module 115C, the data center WAN optimization module 115C forwards this optimized network traffic to the closest edge computer 105E of the content delivery network 103. As described above, the edge computer 105E of the content delivery network 103 then further optimizes this network traffic for transport to the second edge computer 105F and ultimately its intended destination.

In both of these embodiments, the WAN optimization modules 115 provide enhanced data deduplication, data prefetching, and network protocol and application level (e.g. layer 7) optimizations that are not typically implemented in the content delivery network 1-3. Additionally, the content delivery system 103 provides optimized traffic routing between edge computers 105 located near network traffic sources and destinations to further reduce network latency.

In one embodiment, the content delivery network 103 directs optimized network traffic to the edge computer that it thinks is closest to the network destination and configures the WAN optimization application or device 111 at this location to operate with the branch WAN optimization module and/or data center devices 115. In another embodiment, the content delivery network 103 leverages auto-discovery capabilities of the WAN optimization modules 115 to identify and configure a WAN optimization application or device 111 at an edge computer 105. In this embodiment, the content delivery network 103 may pass auto-discovery messages and/or attributes, such as probe messages and/or flags or attributes embedded in messages, through its edge computers 105 and associated WAN optimization modules 111, such that the most appropriate WAN optimization application or device 111 at one of the edge computers 105 is automatically identified and configured by the other WAN optimization modules 115.

In a further embodiment, one or more licensing and configuration portals 127 are used to configure branch, data center, and/or edge computer WAN optimization modules and capabilities. A portal 127 may provide branch WAN optimization module and/or data center devices 115 with authentication information or credentials (such as an authentication token) used to access the content delivery network 103. A portal 127 may also provide configuration information to branch, data center, and/or edge computer WAN optimization modules to enable them to intercept and optimize different types of network traffic and/or cloud computing systems. In yet a further embodiment, users may purchase, rent, or otherwise license optimization capabilities for specific network protocols, types of network traffic, applications, and/or cloud computing systems. These additional optimization capabilities may be delivered to the user from the portal 127 in the form of configuration information needed to implement these optimizations with the user's WAN optimization modules 115 and/or authentication information used to access the content delivery network.

In an embodiment, configuration information may include domain names and/or network addresses (such as IP addresses) of cloud computing systems, edge WAN optimization modules or software modules, identifying characteristics of network traffic to be intercepted and optimized by the branch WAN optimization module, access and authentication parameters for the content delivery network, and optimization parameters used to specify the types of optimizations to be applied by the WAN optimization modules. In some cases, the network addresses (such as IP addresses) of cloud computing systems may not be known in advance or may change frequently. In a further embodiment, the portal and/or one of the WAN optimization modules may intercept DNS requests from client systems for domain names associated with the cloud computing system and use the network addresses received in the corresponding DNS replies to identify network traffic associated with the cloud computing system. In an alternate embodiment, the portal and/or one of the WAN optimization modules may initiate its own DNS requests to determine this information.

In an embodiment branch WAN optimization module or data center devices 115 include CDN interfaces 129 to retrieve authentication and configuration information from a portal 127 for one or more specific network protocols, types of network traffic, applications, and/or cloud computing systems. In response to this authentication and configuration information, the branch WAN optimization module or data center device 115 configures itself to intercept and optimize the network traffic corresponding with the network protocols, types of network traffic, applications, and/or cloud computing systems to be optimized. Additionally, the CDN interfaces 129 perform any required authentication with the content delivery network 103 to enable this optimized network traffic to access the content delivery network 103.

In an embodiment, the CDN interfaces 129 within the branch WAN optimization module and/or data center devices 115 may be implemented as a software module, as part of a virtual machine, and/or as a separate hardware device. Similarly, the WAN optimization capabilities provided by the edge computers 105 and WAN optimization modules 115 may be implemented as software applications or processes, virtual machines, and/or dedicated hardware.

In an embodiment, network traffic optimized by the branch WAN optimization module is encapsulated with an authentication token, previously provided by the portal.

As described in detail below, digital certificates may be exchanged between clients 117, cloud systems 107, edge WAN optimization modules 111, and branch and/or data center WAN optimization modules 115 to enable secure communications.

Figure 2:
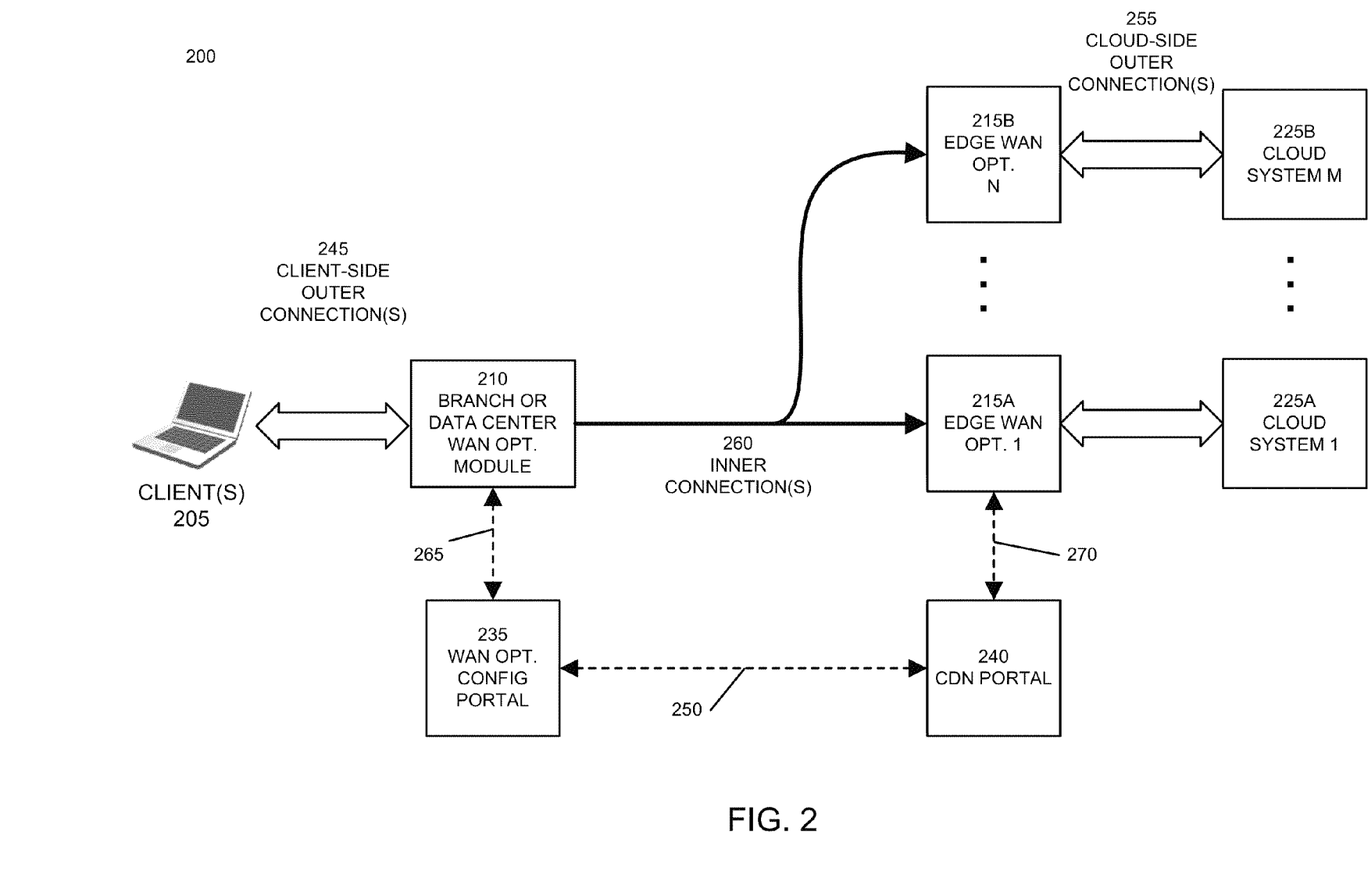
FIG. 2 illustrates example secure network connections between WAN optimization devices within private networks and the content delivery network according to embodiments of the invention.

FIG. 2 illustrates an example 200 of secure network connections between WAN optimization modules within private networks and the content delivery network according to embodiments of the invention. Example 200 includes at least one client 205; at least one branch or data center WAN optimization module 210; one or more edge WAN optimization modules 215, such as edge WAN optimization modules 1 215A to N 215B, where N is any arbitrary positive integer; and one or more cloud systems 225, such as cloud system 1 225A to M, where M is any arbitrary positive integer. Other features, such as branch and data center LANs, public and optional private WANs, and edge computers of the content delivery network, have been omitted from example 200 for clarity.

In this example, the configuration of WAN optimization and content delivery network operation is performed by two portal systems, a WAN optimization configuration portal 235 and a content delivery network (CDN) portal 240. As described in detail below, the configuration performed by the WAN optimization configuration portal 235 and CDN portal 240 includes exchanging digital certificates between the client 205, cloud systems 225, branch and data center WAN optimization modules 210, and the edge WAN optimization modules 215. In alternate embodiments, the configuration of WAN optimization and content delivery network operation may be performed by a single combined portal system. In still a further embodiment, the configuration of WAN optimization and content delivery network operation may be performed by more than two portal systems.

After exchanging digital certificates, three types of secure network connections are formed to facilitate network communications between the client 205 and one or more cloud systems 225. These secure network connections include one or more client-side outer connections 245, one or more cloud-side outer connections 255, and one or more inner connections 260. A client-side outer connection 245 securely communicates network traffic between a client 205 and the branch or data center WAN optimization module 210. From the point of view of the client 205, the client-side outer connection 245 appears to terminate with one of the cloud systems 225. If the client 205 is communicating with multiple cloud systems, then the client 205 may use multiple client-side outer connections 245, such as one for each of the cloud systems 225.

Similarly, one or more cloud-side outer connections 255 securely communicate network traffic between cloud systems 225 and edge WAN optimization modules 215. Each of the edge WAN optimization modules 215 may have one cloud-side outer connection 255 for each cloud system that it communicates with. From the point of view of one of the cloud systems 225, each of its cloud-side outer connections 255 appears to terminate with a client 205. Thus, each of the edge WAN optimization modules 215 may have one cloud-side outer connection 255 for each client for which it is optimizing network traffic.

Branch and/or data center WAN optimization modules 210 and edge WAN optimization modules 215 securely communicate with each other via one or more inner connections 260. The inner connections 260 remain hidden to the cloud systems 225 and client 205. Each of the inner connections 260 is adapted to carry singly and doubly optimized network traffic through the enterprise network, the public WAN, and the content delivery network. In an embodiment, the branch and/data center WAN optimization modules 210 and edge WAN optimization modules 215 communicate with each other via a single inner connection 260 for each client 205 to cloud system 225 connection.

In addition to the client-side outer connections 245, cloud-side outer connections 255 and inner connection 260, the WAN optimization and CDN portals 235 and 240 communicate via a separate network connection 250. WAN optimization configuration portal 235 may communicate via separate network connections 265 with one or more of the branch and/or data center WAN optimization modules 210 to monitor and configure these devices. Similarly, CDN portal 240 may communicate via separate network connections 270 with each of the edge WAN optimization modules 215 to monitor and configure these devices.

In an embodiment, inner connections 260 may be manually created by configuring WAN optimization modules and edge WAN optimization modules. In other embodiments, WAN optimization modules automatically establish inner connections as needed. For example, one embodiment of the invention uses a branch or data center device to identify an edge WAN optimization module closest to any given cloud service or provider to determine its network address and automatically establish an inner connection between these WAN optimization modules.

Figure 3:
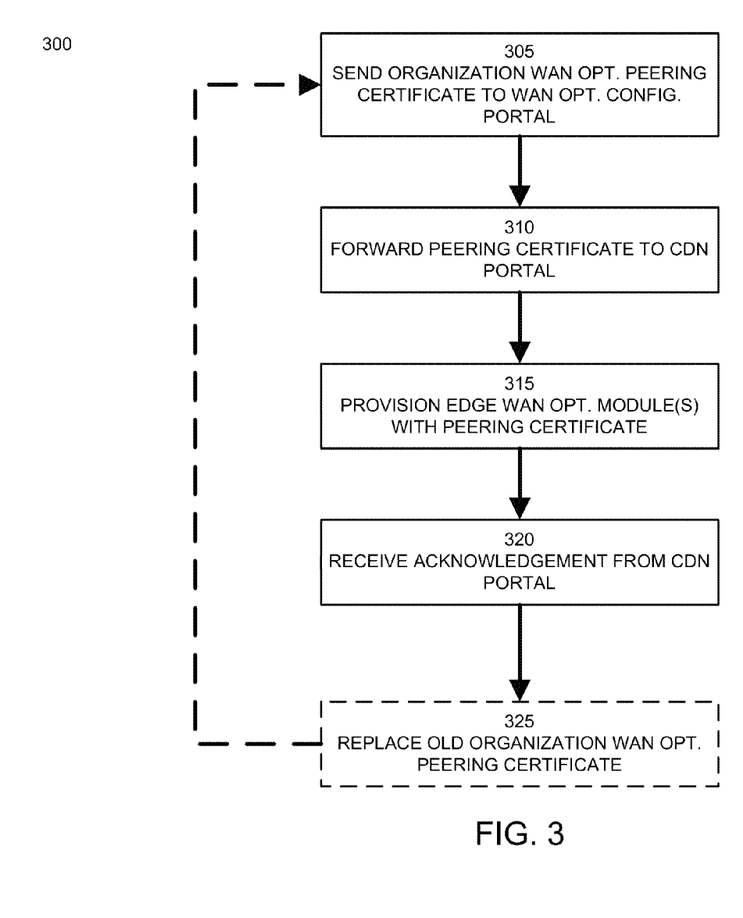
FIG. 3 illustrates a method of distributing and rotating digital certificates to WAN optimization modules in a content delivery network according to an embodiment of the invention.

FIG. 3 illustrates a method 300 of distributing and rotating digital certificates to WAN optimization modules in a content delivery network according to an embodiment of the invention. Method 300 distributes peering digital certificates for branch and/or data center WAN optimization modules, referred to generally as organization WAN optimization modules, to one or more edge WAN optimization modules in a content delivery network. Peering digital certificates are used to establish the inner connection between a pair of WAN optimization modules.

Method 300 begins with step 305 sending an organization WAN optimization peering digital certificate to the WAN optimization configuration portal. An organization WAN optimization peering certificate may be sent automatically by each organization WAN optimization module or manually by an administrative user. Peering digital certificates may be generated using a public or private certificate authority or be self-signed digital certificates. Peering digital certificates may use any public key infrastructure and/or certificate management system known in the art, including those described by standards such as the ITU-T X.509 standard.

Upon receiving a peering certificate, in step 310 the WAN optimization configuration portal forwards the peering certificate to the CDN portal. This communication may be via a secure or insecure network connection and utilize any combination of public and/or private networks.

In step 315, the CDN portal distributes this peering certificate to one or more edge WAN optimization modules. In an embodiment, the content delivery network may dynamically provision edge WAN optimization modules for users based on the cloud systems to be accessed by the users in an organization and the actual and/or expected level of demand from these users. In this embodiment, the CDN portal identifies one or more edge WAN optimization modules allocated to the organization and/or cloud service and distributes the received peering digital certificate to these identified edge WAN optimization modules. The CDN portal may allocate edge WAN optimization modules to an organization based on the actual and/or expected amount of network traffic from the organization as well as the proximity (in terms of network topology) of edge WAN optimization modules to cloud systems.

In step 320, the WAN optimization configuration portal receives an acknowledgement from the CDN portal that the peering digital certificate for its organization WAN optimization module has been distributed to one or more edge WAN optimization modules. In an embodiment of step 320, the WAN optimization configuration portal polls the CDN portal until this acknowledgement is received. Upon the completion of step 320, the edge WAN optimization modules allocated to an organization have the digital certificate needed to establish and operate a secure inner connection with the corresponding organization WAN optimization module. However, as described below, additional digital certificates are needed by the organization WAN optimization module to establish and operate its side of the inner connection and to establish both outer connections.

In some implementations, an organization may want to rotate or occasionally change its peering digital certificates for additional security. To do so, method 300 is repeated beginning at step 305 by sending the new digital certificate for an organization WAN optimization module to the WAN optimization configuration portal. While steps 305-320 are being performed, the edge WAN optimization modules may continue to use the older peering digital certificate for their inner connections. Upon completion of step 320, method 300 proceeds to additional step 325 and the WAN optimization configuration portal directs the organization WAN optimization module to replace its older peering digital certificate with the new digital certificate. Method 300 including optional step 325 may be repeated as needed to rotate additional new peering digital certificates.

Figure 4:
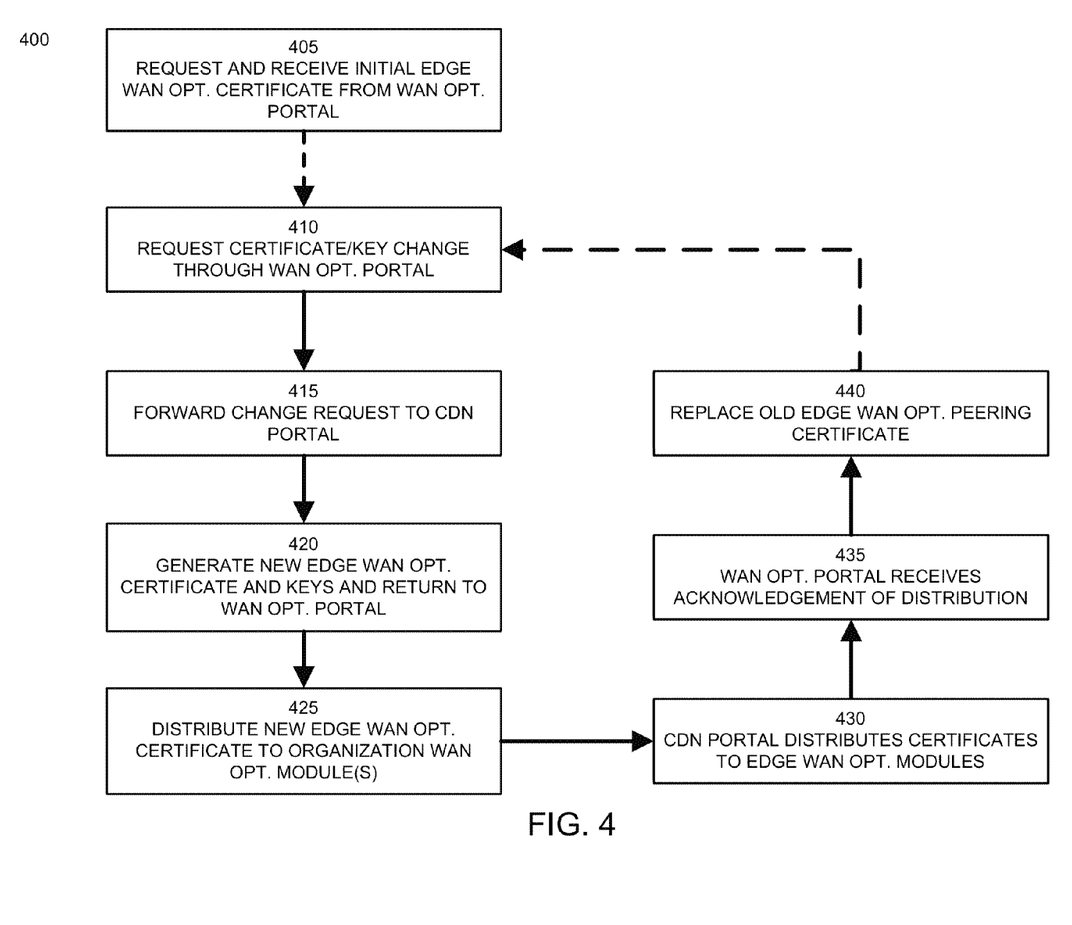
FIG. 4 illustrates a method of distributing and rotating digital certificates to WAN optimization modules in a client's private network according to an embodiment of the invention.

FIG. 4 illustrates a method 400 of distributing and rotating digital certificates to WAN optimization modules in a client's private network according to an embodiment of the invention. Method 400 distributes peering digital certificates for one or more content delivery network edge WAN optimization modules to organization WAN optimization modules in a content delivery network. Peering digital certificates are used to establish the inner connection between a pair of WAN optimization modules.

Method 400 begins with step 405 requesting an initial content delivery network edge WAN optimization peering digital certificate from the WAN optimization configuration portal. Each organization WAN optimization module may make this request automatically or an administrative user may make this request on behalf of the organization WAN optimization modules. The WAN optimization configuration portal receives the initial content delivery network edge WAN optimization peering digital certificate from the CDN portal, which also distributes this peering digital certificate to the content delivery network edge WAN optimization modules allocated to this organization. In an embodiment, the content delivery network uses a different edge WAN optimization peering digital certificate for each enterprise or organization.

Upon receiving a request for an initial edge WAN optimization peering digital certificate, the WAN optimization configuration portal returns the requested peering certificate to the requesting WAN optimization module or administrative user. In the latter case, the administrative user may then distribute this edge WAN optimization peering digital certificate to one or more organization WAN optimization devices.

Upon the completion of step 405, the organization WAN optimization modules have the peering digital certificate needed to establish and operate a secure inner connection with the corresponding content delivery network edge WAN optimization modules. However, as described below, additional digital certificates are needed to establish both outer connections.

In some implementations, an organization may want to rotate or occasionally change its peering digital certificates for additional security. To do so, method 400 optionally proceeds to step 410. In step 410, the WAN optimization configuration portal receives a request to change the edge WAN optimization peering digital certificate. This request may be sent by an administrative user or generated automatically, such as after a period of time has elapsed.

In response, in step 415 the WAN optimization configuration portal forwards the request to the CDN portal. This communication may be via a secure or insecure network connection and utilize any combination of public and/or private networks.

In step 420, the CDN portal or other entity within the content delivery network generates a new edge WAN optimization peering digital certificate and any associated cryptography keys and returns them to the WAN optimization configuration portal. In step 425, the WAN optimization configuration portal distributes the new edge WAN optimization peering digital certificate to one or more organization WAN optimization modules. Additionally, in step 430, the CDN portal distributes the new edge WAN optimization peering digital certificates to one or more of the content delivery network edge WAN optimization modules allocated to the organization.

In step 435, the WAN optimization configuration portal receives acknowledgement of the distribution of the edge WAN optimization peering digital certificates to the content delivery network edge WAN optimization modules.

While steps 410-435 are being performed, the organization WAN optimization modules may continue to use the older peering digital certificate for their inner connections. Upon completion of step 435, in step 440 the WAN optimization configuration portal directs its organization WAN optimization modules to replace their old edge WAN optimization peering digital certificates with the newly received edge WAN optimization peering digital certificates. Steps 410-440 of method 400 may be repeated as needed to rotate additional new edge WAN optimization peering digital certificates.

Methods 300, 400, 500, and 550 (discussed below) may be performed in any order. Following the completion of methods 300 and 400, the organization and edge WAN optimization modules have the peering digital certificates needed to establish one or more secure inner connections. However, to establish secure outer connections with clients and cloud systems, additional digital certificates, referred to as shadow certificates, need to be exchanged. Shadow digital certificates are used to establish a secure client-side outer connection between a client system and a WAN optimization module. A shadow digital certificate is adapted to imitate or "shadow" the digital certificates provided by a cloud system, so that the client system believes that this client-side outer connection is securely communicating directly with the cloud system. In one embodiment, shadow digital certificates are distributed to edge WAN optimization modules. When a client attempts to establish a secure connection with a cloud service, the shadow digital certificates are used to generate session keys. The edge WAN optimization module then transfers the session keys through the inner connection to the organization WAN optimization module, where these session keys will be used to establish a secure client-side outer connection. In another embodiment, the organization WAN optimization modules use the shadow digital certificates to generate session keys themselves.

Figure 5A:
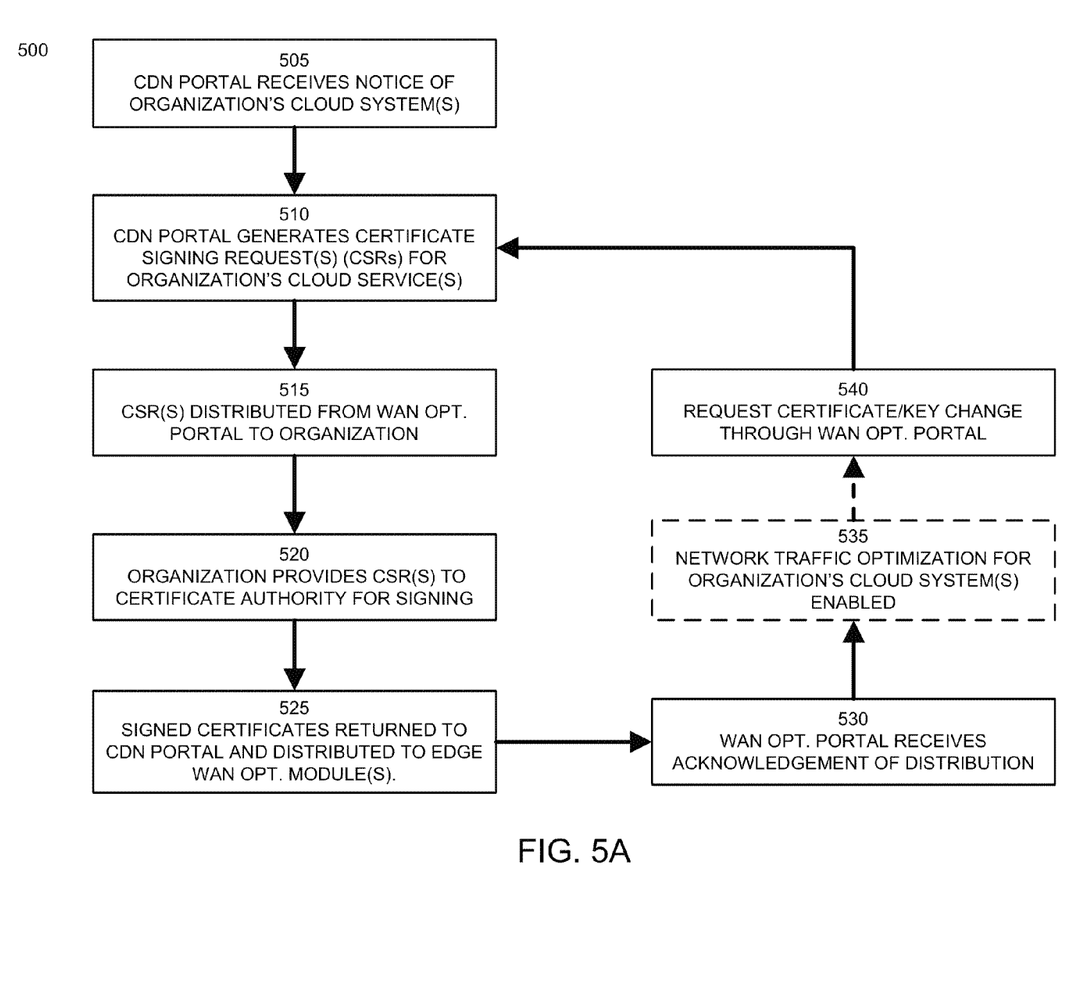
FIGS. 5A-5B illustrate methods of distributing and rotating shadow digital certificates to WAN optimization modules in a client's private network and a content delivery network according to embodiments of the invention.

FIG. 5A illustrates a method 500 of distributing and rotating shadow digital certificates to WAN optimization modules in a client's private network. In step 505, the CDN portal receives a notification of an organization's cloud systems and/or services to be optimized. The CDN portal may receive this notification from one or more of the organization's WAN optimization modules, from the organization's WAN optimization configuration portal, or from an administrative user in the organization. This notification may be sent manually as directed by an administrative user or automatically, for example upon purchasing a license for optimizing one or more cloud systems or configuring one or more organization WAN optimization modules to optimize network traffic associated with a cloud system or service.

In response to receiving this notification, in step 510 the CDN portal generates one or more certificate signing requests (CSRs) for the one or more cloud systems and/or services to be optimized for the organization. Some cloud systems and services use multiple domains or associated systems or services to provide functionality to their clients. For example, a cloud document editing system may use a first domain to provide cloud data storage of electronic documents, a second domain to provide the document editing application itself, and a third domain to handle user authentication and security. In an embodiment, the CDN portal uses configuration information, such as a template or other data structure, to generate CSRs for all of the domains or other associated systems used by a cloud system. The configuration information may be maintained by the content delivery network provider, the WAN optimization module provider, the cloud system provider, or a third party.

In an embodiment, step 515 transfers one or more CSRs from the CDN portal to the WAN optimization configuration portal and then to an administrative user of the organization. In an embodiment of step 520, the administrative user provides these CSRs to a certificate authority for signing and receives one or more signed shadow certificates in return. The certificate authority may be operated by the organization or a third party.

In step 525, the administrative user returns the signed shadow certificates to the WAN optimization configuration portal, which in turn communicates these signed certificates to the CDN portal. The CDN portal then distributes the signed shadow certificates to one or more edge WAN optimization modules allocated to the organization for use with one or more cloud systems.

In step 530, the WAN optimization configuration portal receives an acknowledgement from the CDN portal that the signed shadow digital certificates for one or more of its cloud systems has been distributed to one or more edge WAN optimization modules. In an embodiment of step 530, the WAN optimization configuration portal polls the CDN portal until this acknowledgement is received. Upon the completion of step 530, the edge WAN optimization modules have the shadow digital certificates needed to generate session keys and send them to the organization WAN optimization module that will in turn establish and operate a secure outer connections with their client systems. For example, an edge WAN optimization module may use the signed shadow digital certificate to imitate a cloud system and create a secure outer connection between a client and the organization WAN optimization module.

If the WAN optimization modules have sufficient information to establish their inner connections, for example if methods 300 and 400 have previously been performed, then in optional step 535 the WAN optimization configuration portal may enable network traffic optimization for the organization's cloud systems.

In some implementations, an organization may want to rotate or occasionally change its shadow digital certificates for additional security. To do so, step 540 requests a certificate and cryptography key change through the WAN optimization configuration portal. The WAN optimization configuration portal forwards this request to the CDN portal. Method 500 is then repeated beginning at step 510. While steps 510-530 are being performed, the WAN optimization modules may continue to use the older shadow digital certificate for their client-side outer connections. Method 500 including optional step 535 may be repeated as needed to rotate additional new shadow digital certificates.

Figure 5B:
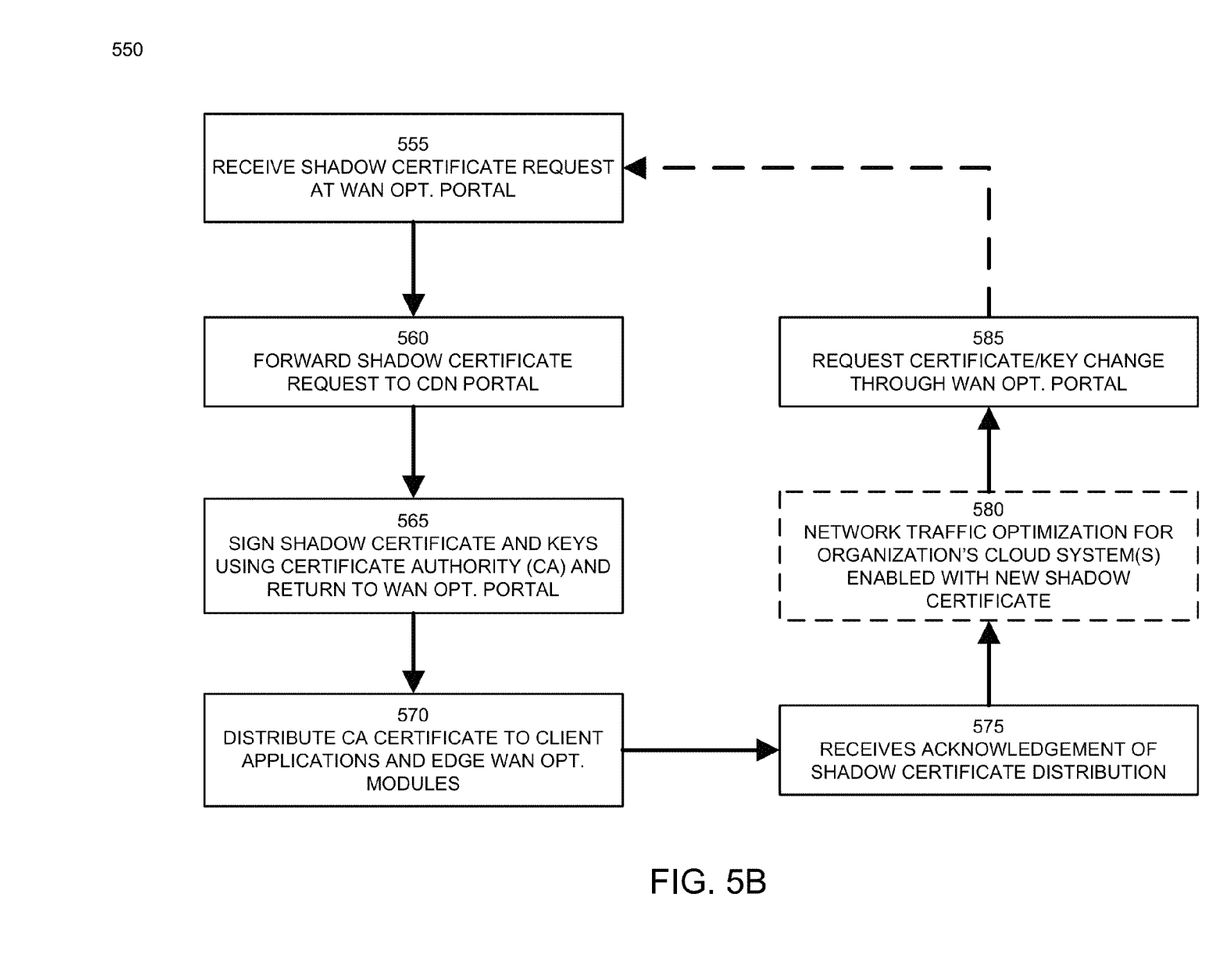

FIG. 5B illustrates a method 550 of distributing and rotating shadow digital certificates to WAN optimization modules in a client's private network and a content delivery network according to an embodiment of the invention. In this embodiment, the content delivery network includes a certificate authority for signing shadow certificates to be used by client applications and edge WAN optimization modules.

Step 555 receives a shadow certificate request at the WAN optimization configuration portal from an organization WAN optimization module or an administrative user. In response to this shadow certificate request, step 560 forwards the request from the WAN optimization configuration portal to the CDN portal. In step 565, one or more new shadow certificates and keys are signed by a certificate authority within the content delivery network. The certificate authority (CA) certificate is returned to the WAN optimization configuration portal.

Step 570 distributes the returned CA certificate to client applications, such as web browser applications executing on client devices. In an embodiment, an administrative user may manually initiate the installation of the CA certificate on client applications. Simultaneously, step 570 also distributes shadow certificates to one or more edge WAN optimization modules allocated to the organization and/or cloud service.

Step 575 receives acknowledgement of the distribution of the shadow certificates to edge WAN optimization modules. This acknowledgement may be received at the WAN optimization configuration portal and CDN portal.

If the WAN optimization modules have sufficient information to establish their inner connections, for example if methods 300 and 400 have previously been performed, then in optional step 580 the WAN optimization configuration portal may enable network traffic optimization for the organization's cloud systems.

In some implementations, an organization may want to rotate or occasionally change its shadow digital certificates for additional security. To do so, step 585 requests a certificate and cryptography key change through the WAN optimization configuration portal. Method 550 is then repeated beginning at step 555. While steps 555-575 are being performed, the WAN optimization modules may continue to use the older shadow digital certificate for their outer connections. Method 550 including optional step 580 may be repeated as needed to rotate additional new shadow digital certificates.

As described above, the operations of methods 300, 400, 500, and 550 are performed in part by a pair of portal systems. In alternate embodiments, a single combined portal system may replace the roles of the WAN optimization configuration portal and the CDN portal in methods 300, 400, 500 and/or 550. In yet further alternate embodiments, three or more portal systems may replace the roles of the WAN optimization configuration portal and the CDN portal in methods 300, 400, 500, and/or 550.

Figure 6:
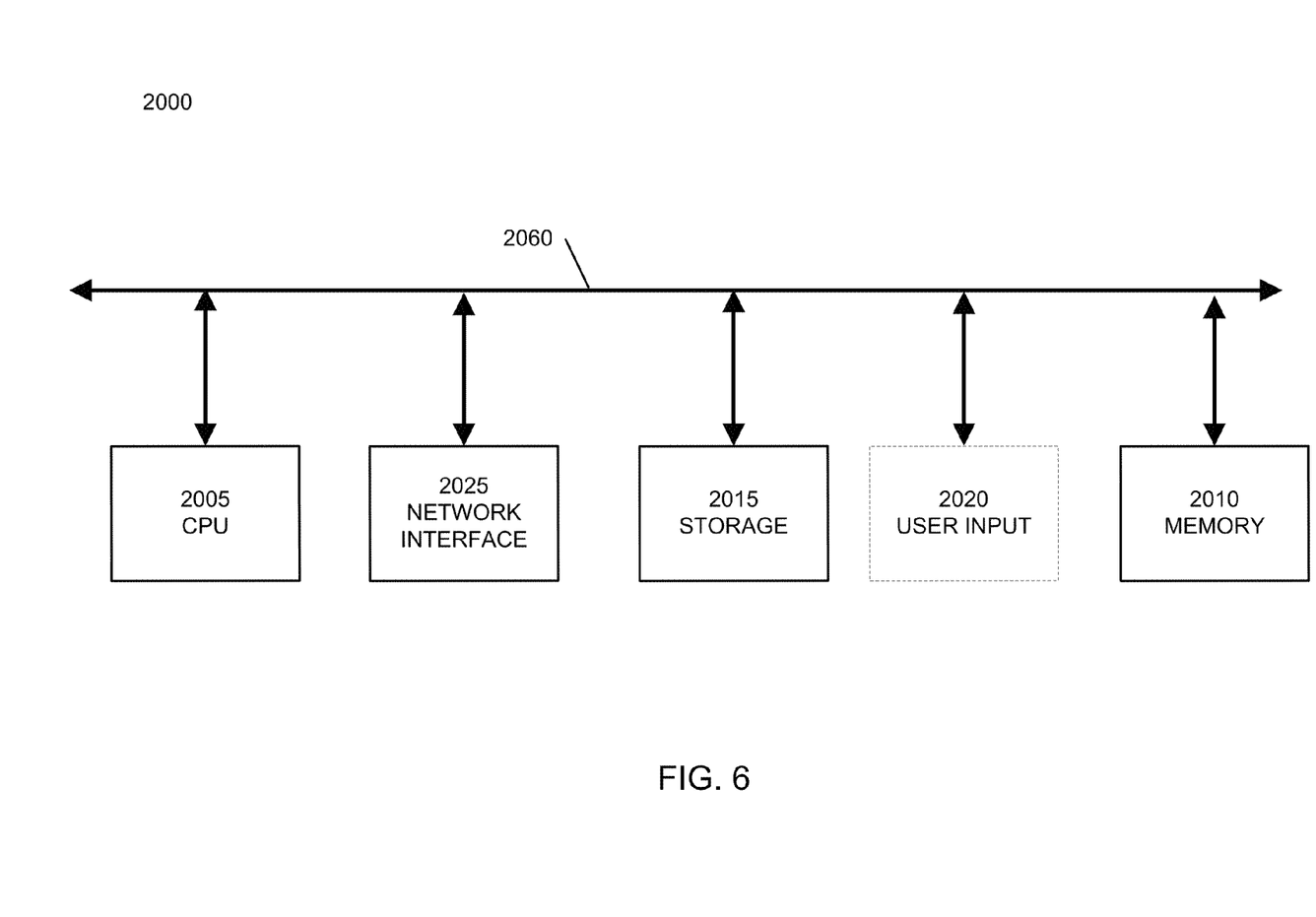
FIG. 6 illustrates an example computer system capable of implementing a WAN optimization device according to an embodiment of the invention.

FIG. 6 illustrates an example computer system 2000 capable of implementing a WAN optimization device according to an embodiment of the invention. FIG. 6 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of exchanging digital certificates in a network traffic optimization system, the method comprising:
generating a first digital certificate associated with a first WAN optimization module in a first network, wherein the first network includes multiple WAN optimization modules;
forwarding the first digital certificate to at least a first management portal;
using the first management portal, identifying at least a second WAN optimization module in a second network allocated to optimize network traffic from the first WAN optimization module, wherein the second network corresponds to a content delivery network, wherein the second WAN optimization module includes an edge WAN optimization module included in the content delivery network, and wherein the content delivery network includes multiple edge WAN optimization modules; and distributing the first digital certificate to the identified second WAN optimization module.

2. The method of claim 1, wherein forwarding the first digital certificate to at least the first management portal comprises:

forwarding the first digital certificate to a second management portal; and using the second management portal, forwarding the first digital certificate to the first management portal.

3. The method of claim 2, wherein the first management portal is associated with the second network and the second management portal is associated with the first network.

4. The method of claim 1, wherein distributing the first digital certificate to the identified second WAN optimization module comprises:

replacing a previous digital certificate used by the second WAN optimization module with the first digital certificate.

5. The method of claim 1, wherein the first management portal identifies the second WAN optimization module based at least in part on a cloud system to be accessed by a client in the first network.

6. The method of claim 1, wherein the first management portal identifies the second WAN optimization module based at least in part on a measure of usage from at least one client in the first network.

7. The method of claim 1, wherein the first management portal includes a content delivery network portal.

8. The method of claim 1, wherein the first management portal includes a WAN optimization configuration portal.

9. The method of claim 1, wherein the second WAN optimization module includes an organization WAN optimization module included in an organization network.

10. The method of claim 1, wherein the first digital certificate is adapted to establish a secure inner network connection between the first and second WAN optimization modules.

11. A method of exchanging digital certificates in a network traffic optimization system, the method comprising:

identifying at least a first cloud system to be accessed by a client on a first network, wherein the first network includes multiple WAN optimization modules;

generating at least one certificate signing request for the identified first cloud service;

forwarding the certificate signing request to at least a first management portal associated with the first network;

receiving at least one signed digital certificate at the first management portal in response to the certificate signing request;

identifying at least a first WAN optimization module in a second network allocated to optimize network traffic from the first network, wherein the second network corresponds to a content delivery network, wherein the second WAN optimization module includes an edge WAN optimization module included in the content delivery network, and wherein the content delivery network includes multiple edge WAN optimization modules; and distributing the signed digital certificate to the identified first WAN optimization module.

12. The method of claim 11, wherein identifying at least the first WAN optimization module in the second network is performed by a second management portal associated with the second network.

13. The method of claim 11, wherein generating at least one certificate signing request comprises:

identifying at least one additional cloud system associated with the first cloud system; and generating certificate signing requests for the first cloud system and the additional cloud system.

14. The method of claim 13, wherein identifying the additional cloud system comprises:

accessing predefined configuration information to identify the additional cloud system associated with the first cloud system.

15. The method of claim 11, wherein the first WAN optimization module in the second network is identified based at least in part on a cloud system to be accessed by a client in the first network.

16. The method of claim 11, wherein the first WAN optimization module in the second network is identified based at least in part on a measure of usage from at least the client in the first network.

17. The method of claim 11, wherein the first management portal includes a WAN optimization configuration portal.

18. The method of claim 11, wherein the signed digital certificate is adapted to establish a secure outer network connection between the first cloud system and the first WAN optimization modules.

19. The method of claim 11, distributing the signed digital certificate to the identified first WAN optimization module comprises:

replacing a previous signed digital certificate used by the identified first WAN optimization module with the signed digital certificate.

* * * * *